United States Patent [19]

Carrasco et al.

[11] Patent Number: 4,567,328
[45] Date of Patent: Jan. 28, 1986

[54] ENERGY DETECTION CIRCUIT FOR A FACSIMILE SYSTEM CONTROLLER

[75] Inventors: Francis P. Carrasco, Danbury; Gerard A. DeRome, New Milford; David W. Fernekes, Danbury, all of Conn.

[73] Assignee: Burroughs Corp., Detroit, Mich.

[21] Appl. No.: 613,341

[22] Filed: May 23, 1984

[51] Int. Cl.[4] .......................................... H04M 11/00
[52] U.S. Cl. .................................. 179/2 A; 179/81 R
[58] Field of Search ................. 179/2 A, 81 R, 84 R, 179/84 VF, 90 AD, 90 B, 2 DP, 5 R, 5 P, 90 BB, 90 BD, 90 CS

[56] References Cited

U.S. PATENT DOCUMENTS

| | | |
|---|---|---|
| 3,748,395 | 7/1973 | Herter . |
| 4,012,600 | 3/1977 | Warren ......................... 179/90 AW |
| 4,178,485 | 12/1979 | Cowpland et al. ............. 179/18 FA |
| 4,213,016 | 7/1980 | Brockmann et al. ......... 179/175.3 R |
| 4,241,237 | 12/1980 | Paraskevakos et al. ........ 179/5 R X |
| 4,281,219 | 7/1981 | Cowpland et al. ............. 179/18 FA |
| 4,315,106 | 2/1982 | Chea, Jr. ............................ 179/16 F |
| 4,405,833 | 9/1983 | Cave et al. ...................... 179/5 R X |

*Primary Examiner*—James L. Dwyer
*Attorney, Agent, or Firm*—Mark T. Starr; Kevin R. Peterson

[57] ABSTRACT

Disclosed is an energy detection circuit for use in a facsimile system autodialer/controller. The circuit monitors a telephone line and nulls out transmit tones leaving only receive signals. The analog receive signals are processed to produce a digital signal indicating the on-off times of receive energy on the telephone line. The energy on-off times may then be evaluated by a microprocessor included in the facsimile system autodialer/controller to determine whether a dial tone, busy signal or ring back is being received.

18 Claims, 10 Drawing Figures

NOTE: V4 IS LOW WHEN THERE IS A SIGNAL ON THE LINE; I.E., VRX >35 DBM.

ENERGY DETECTION CIRCUIT FOR A FACSIMILE SYSTEM CONTROLLER

BACKGROUND OF THE INVENTION

The present energy detect circuit is adapted for use in an autodialer/controller for facsimile equipment. Such a controller interconnects a facsimile unit with a standard telephone line. It may perform multiple poll and send commands at preprogrammed times of the day, thereby minimizing operator involvement.

Once the controller completes its connection to the intended remote receiving unit, it turns control over to the local facsimile unit.

Prior art autodialer/controllers do not include the ability to detect dial tones, busy signals or ring backs. Instead, they assume that a dial tone will be available or a WATS line available after dialing an access code. For example, when a prior art autodialer attempts to access a WATS line, it dials an access code and then waits a predetermined time before it continues dialing. It assumes that after the predetermined time the WATS line will be set up and not busy, and dials the number of the receiver it is to communicate with. If the WATS line is busy or is not set up, it still proceeds to attempt to complete the call. Obviously, the attempt is unsuccessful.

Similar problems are experienced with prior art autodialers which interface with a private branch exchange which requires a security code to be sent by the autodialer in order to gain access to a WATS or unrestricted telephone line.

It is desirous to be able to detect busy signals, dial tones in order to control the operations of an autodialer. For example, if these signals could be detected, then an autodialer controlled by a microprocessor could dial the access code for a WATS line and wait until a dial tone is received prior to continuing to dial. If a busy signal is received, then the autodialer can wait a few minutes and attempt to access the line again. Similarly, the above mentioned problems with entering security codes could be eliminated.

An autodialer/controller which is responsive to dial tones, ring backs, and busy signals gives improved performance. Thus, it need not wait a predetermined time before dialing when a dial tone is available before the predetermined time elapses. Additionally, if a busy signal is detected, it will not attempt to turn control over to the facsimile system. Instead, it can be designed to redial the number until a connection is made and only then turn control over to the local facsimile equipment.

In order to implement the latter mentioned capabilities, an autodialer/controller may employ a programmed microprocessor which can execute commands programmed into it by a user. Thus, those skilled in the art will appreciate that it is quite feasible to program the microprocessor to dial a number and if a busy signal is detected, redial the number again in five minutes.

One problem that must be overcome in such a microprocessor controlled autodialer/controller is to prevent signals being transmitted onto a phone line from being confused with those being received from a remote PBX or other transmitter. Thus, the autodialer/controller must avoid interpreting signals it transmits as receive signals.

Another problem that must be overcome is the recognition of busy tones, dial tones and ring backs. Obviously, the programmed microprocessor cannot easily interpret these analog signals as they are received from the phone line. However, if these analog signals are translated into digital signals, the microprocessor can readily interpret which type of signal is being received.

Busy tones, ring back and dial tones consist of defined analog energy on-off patterns. These patterns are made up of analog signals having a specific power level and a specific bandwidth. By assuring that the signals meet the bandwidth and power levels, noise on the telephone line can be eliminated, leaving pure analog receive signals. If these signals are then transformed into a digital signal indicating the presence or absence of energy above a minimum power level and within the defined bandwidth, then this digital signal can be readily analyzed by the microprocessor to determine if a dial tone, busy signal, ring back, or some other signal is being received. For example, a dial tone is defined by the presence of continuous energy for greater than two seconds. Given a digital signal input indicating the presence of energy, the microprocessor can easily determine if continuous energy is present for at least two seconds. If it is, the microprocessor knows it has a dial tone and can proceed to dial the number it is programmed to access.

It is the general object of the present invention to overcome the drawbacks of the prior art by providing a circuit for use in a facsimile equipment controller which detects energy on a telephone line within the bandwidth and power range associated with signals transmitted from a remote PBX.

It is a further object of the present invention to provide a circuit for detecting energy on a telephone line which provides at its output a digital signal indicating the presence or absence of energy.

It is an additional object of the present invention to provide a circuit for detecting energy on a telephone line which utilizes CMOS circuitry that is driven by a single power supply.

It is another object of the present invention to provide a circuit for use in an autodialer for facsimile equipment which detects the presence of energy on a telephone line and additionally separates out receive signals.

These and other objects, features and advantages of the present invention will become more apparent from the detailed description of the preferred embodiment when read in conjunction with the drawings.

SUMMARY OF THE INVENTION

Disclosed is an energy detection circuit for use in an autodialer/controller for facsimile equipment. The circuit is coupled to a telephone line via an isolation transformer and additionally receives DTMF tones transmitted by the autodialer onto the telephone line. At the circuit's output, a digital signal is provided indicating the receipt of energy above a specified power level and within a specified bandwidth. Specifically, the energy detected is that associated with dial tones, ring backs and busy signals. The digital output may be input to a microprocessor included in the facsimile autodialer/controller which evaluates the energy patterns to determine the type of signal being received.

In the circuit's first stage, DTMF tones originating from the autodialer/controller are nulled out from the signals on the telephone line, leaving only the true receive signals. The receive signals are amplified and passed to the second stage which filters out noise which is outside of the bandwidth of expected receive signals. The signal output by the second stage is again amplified in the third stage in order to be compatible with the fourth stage. In the fourth stage, the sinusoidal output of the third stage charges a capacitor and the voltage on the capacitor is input to a comparator which compares the voltage across the capacitor with a reference level. When the capacitor voltage goes above the reference level, the output of the comparator goes negative indicating that energy within the specified bandwidth and above the specified power level is present. A long discharge time constant is provided for the capacitor in order to prevent the comparator's output from swinging on each half cycle of the sinusoidal input to the comparator.

When the input to the fourth stage drops below the reference level and remains below it for the discharge time, the output of the comparator goes positive. Thus by swinging between only two levels, the comparator output provides a digital signal indicating the presence or absence of energy in the receive signal.

The digital signal may be inputted to a microprocessor within the facsimile autodialer/controller which will analyze the energy on-off times to determine whether a dial tone, busy signal or ring back signal is being received.

DETAILED DESCRIPTION OF THE PREFERRED EMBODIMENT

Figure 1:
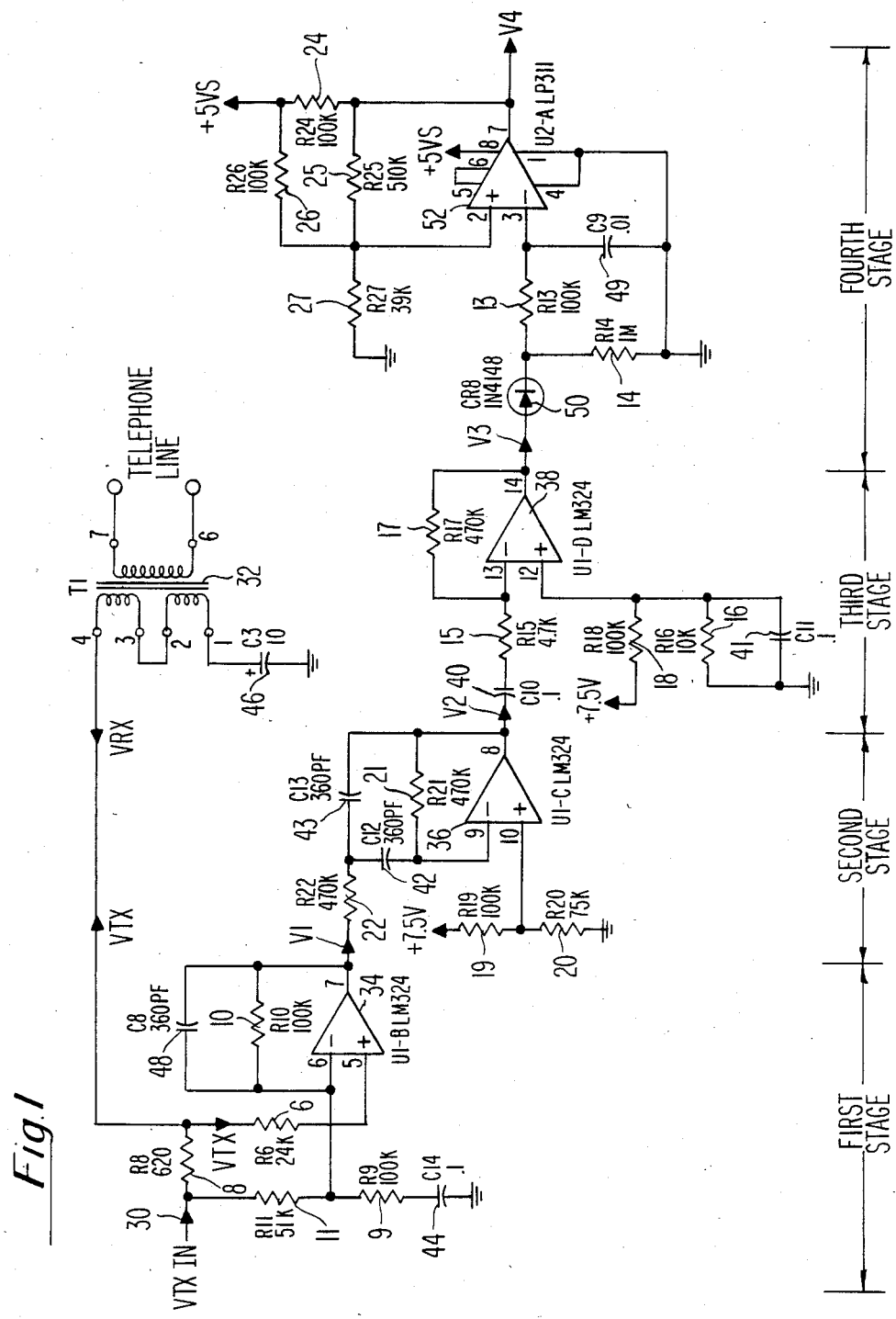
FIG. 1 is a schematic of the preferred embodiment of the present invention implemented in CMOS circuitry.

Referring to the drawings, FIG. 1 illustrates the preferred embodiment of the present energy detect circuit. Transmit signals VTXIN originating from the autodialer are received by the energy detect circuit on input line 30. The transmit signals VTXIN include the dual tone multiple frequency (DTMF) tones utilized by the autodialer for dialing remote equipment configured downline on the telephone line.

The energy detect circuit is coupled to the telephone line via a standard isolation transformer 32 having an input impedance RL of 600 ohms. Signals VRX received on the phone line from remote equipment are coupled into the energy detect circuit via the isolation transformer 32 and are presented to the energy detect circuit at tap 4 of transformer 32. DTMF signals VTXIN transmitted by the autodialer follow a path through resistor 8 and then into tap 4 of the transformer 32 and are then sent onto the telephone line.

Figure 2A:
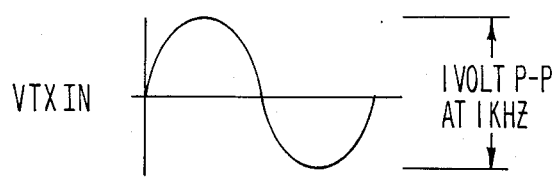
FIGS. 2A-2G illustrate typical signals inputted to the circuit of FIG. 1 and the resulting signals produced at various points in the circuit.
Figure 2B:
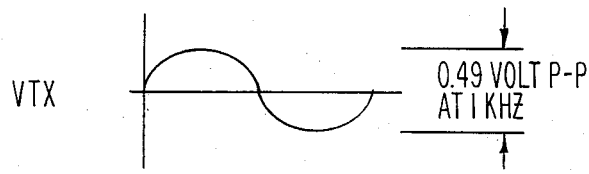
Figure 2C:

Those skilled in the art will appreciate that both the transmit signals VTXIN (FIG. 2A) and the receive signals VRX (FIG. 2C) are within the same frequency range. In general, the transmit signals VTXIN are of larger magnitude than the receive signals VRX since the receive signals VRX amplitude is dependent on the distance of the autodialer from the remote equipment. In general, the receive signals VRX are in the range of $-6$ dbm to $-30$ dbm. As will be apparent from the discussion to follow, the amplitude of the transmit VTXIN signals and receive signals VRX is unimportant to the operation of the present invention.

The receive signals VRX include signals corresponding to a dial tone, a busy tone or a ring back. In the first stage of the energy detect circuit, the transmit signals VTXIN are nulled out so that a signal corresponding only to the receive signals VRX is provided as the output V1 of the first stage. This action is necessary to avoid interpreting transmit signals VTXIN as receive signals VRX in subsequent stages of the energy detect circuit.

First, we shall consider how the first stage nulls out any transmit signals VTXIN which may be present. The transmit signal VTXIN goes through resistor 11 into the negative input 6 of operational amplifier (op amp) 34 and is fed back through resistor 10. As a result, the transmit signal VTXIN is given an inverting gain GI of $$GI = R10/R11 = 1.96 \tag{1}$$

The transmit signal VTXIN also goes through resistors 8 and 6 and into the positive input of op amp 34. After passing through resistor 8, the transmit signal is modified due to the effective impedance of the isolation transformer 32. Hence, the signal entering resistor 6 and transmitted onto the telephone line due to the transmit signal VTXIN is $$VTX = VTXIN \frac{RL}{RL + R8} \tag{2}$$

This signal VTX (FIG. 2B) is then given a noninverting gain GNI of $$GNI = 1 + \frac{R10(R9 + R11)}{R9(R11)} = 3.96 \tag{3}$$

As a consequence, the voltage V1 at the output of the first stage due to VTXIN is $$V1TX = GNI\ (VTX) - GI\ (VTXIN) \tag{4}$$

Substituting equations 1, 2 and 3 into equation 4, we have $$\begin{aligned} V1TX &= 3.96 \left( VTXIN \frac{600}{600 + 620} \right) - 1.96\ (VTXIN) \\ &= 1.95\ VTXIN - 1.96\ VTXIN \\ &= -0.01\ VTXIN \end{aligned} \tag{4a}$$

Considering that a typical level for a transmit signal VTXIN is one volt peak-to-peak, then the contribution to V1 due to VTXIN is approximately 0.01 volt peak-to-peak, or for practical matters zero. Hence, it has been shown that the first stage of the present energy detect circuit is effective to null out any inputted transmit signals VTXIN.

Next, consideration will be given to receive signals VRX from remote equipment which are received through pin 4 of isolation transformer 32. Such signals follow a path through resistor 6 and into the plus input 5 of op amp 34. As a result, at the output of the first stage the receive signals VRX have been subjected to a noninverting gain of 3.96. Hence, for a typical receive signal VRX level of 0.05 volt peak-to-peak, at the output of the first stage a signal VIRX due to VRX of 0.20 volt peak-to-peak is obtained.

Since VITX is negligible, the effective output V1 of the first stage consists entirely of the receive signal VRX multiplied by a gain of 3.96. In summary then, the first stage of the energy detect circuit is effective to null out any transmit signals VTXIN and give a gain of four to any receive signals VRX.

Those skilled in the art will further appreciate that the first stage additionally rolls off high frequency signals. That is, capacitor 48 provides a frequency roll-off of 6 db per octave to eliminate any noise.

Those skilled in the art will further realize that by changing the values of resistors 10 and 11, the gain given to the receive signals VRX may be increased or decreased from 3.96.

Figure 2D:
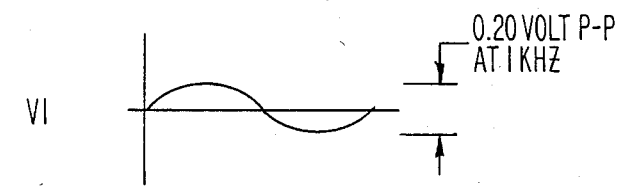
Figure 3A:
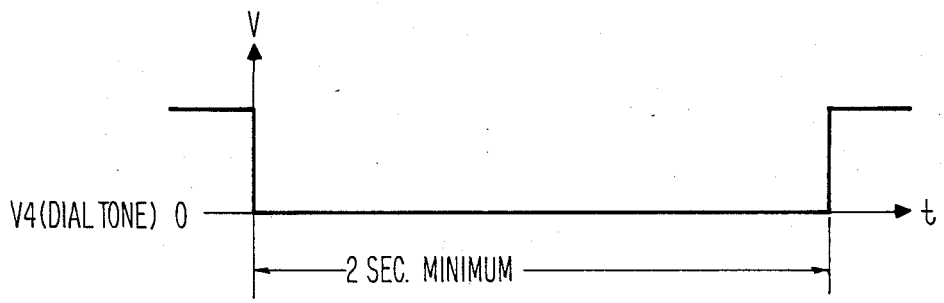
FIG. 3A-3B illustrate digitized waveforms indicating the power on-off patterns associated with a dial tone and a busy signal.
Figure 3B:
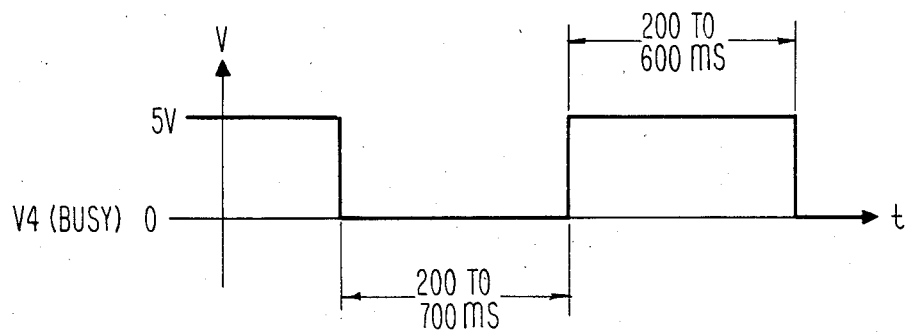

At the entry point of the second stage of the energy detect circuit, the signal V1 (FIG. 2D) corresponding to the receive signal VRX multiplied by a gain of four is provided. The second through fourth stages of the energy detect circuit detects the presence of energy levels greater than −30 dbm and within the bandwidth of 360 Hertz to 2700 Hertz. At the output of the energy detect circuit, a digital signal V4 indicating the presence or absence of energy is provided. This digital signal V4 may be inputted to a microprocessor (not shown) and interpreted to determine whether a dial tone, busy tone, or ring back tone is being received. Thus, those skilled in the art will appreciate that software may be readily designed to interpret the on-off times of energy on the phone line to determine if any of the latter three tones is being received. For example, if the software recognizes a repeating pattern of energy on the telephone line between 200 and 700 milliseconds followed by an energy off time of between 200 and 600 milliseconds, then it concludes that a busy tone (FIG. 3B) is being received. In a similar fashion, a dial tone (FIG. 3A) is detected by the software when continuous energy is present for greater than two seconds. Determining the presence of a ring back tone is somewhat more difficult since the energy on-off times vary depending on the type of private branch exchange (PBX) being utilized.

The second stage of the energy detect circuit is a bandpass filter with 3 db frequencies of 390 Hertz and 2271 Hertz, and a midland gain of −0.5. Its purpose is to filter unwanted noise components out of the V1 signal. In the second stage, a d.c. offset is applied via resistors 19 and 20 to bias the incoming signal V1 so that instead of swinging above and below ground, it swings between 0 and 7.5 volts. The offset is necessary since a minus supply is not provided on op amp 36. The offset is applied at the positive input 10 of op amp 36 so that the op amp 36 will function within its linear region and the output 16 of the op amp 36 will swing around the offset. If a d.c. offset was not provided, the negative portion of the incoming signal V1 would be clipped off because op amp 36 would not allow the signal to swing below ground since it does not have a negative supply.

Figure 2E:
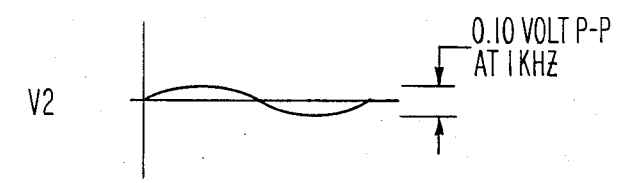

After the output of the second stage, the signal V2 (FIG. 2E) passes through capacitor 40 as it enters the third stage. Capacitor 40 is a d.c. blocking capacitor which strips off the d.c. offset which was applied in the second stage. The d.c. offset is removed since the third stage provides gain and if the d.c. offset was left on, it would cause the output of the third stage to erroneously indicate that there is energy on the line even though at times there was no signal inputted to op amp 38.

For the same reasons as in the second stage, a d.c. offset is applied via resistors 16 and 18 to the positive input 12 of op amp 38. That is, since op amp 38 does not have a negative supply, the d.c. offset assures that the op amp 38 will operate within its linear region even though the input signal on pin 13 swings below ground.

In addition to applying a d.c. offset of 0.68 volts, the third stage amplifies the input signal by a factor of 100 (or 40 db), the gain being controlled by resistors 15 and 17. This is necessary since the signal V2 inputted to the third stage is in the range of −30 dbm, which is insufficient to trigger the circuitry in the fourth (or last) stage. As a result, the signal V3 at the output of the third stage is d.c. offset by 0.68 v. and swings between the d.c. offset and a peak voltage of 4.95 v.

Figure 2F:
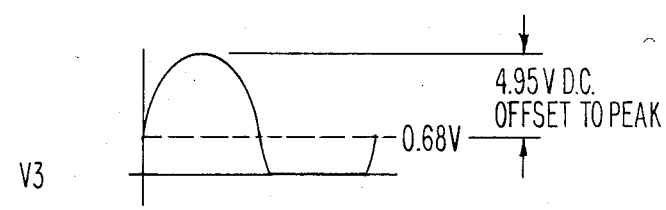

At the entry to the fourth (or last) stage, V3 (FIG. 2F) passes through diode 50. Diode 50 blocks the d.c. offset that was applied in the third stage. This is necessary since the d.c. offset would be interpreted as energy by the fourth stage. The diode 50 additionally serves to make sure that signals can pass in the forward direction and charge up capacitor 49.

The purpose of the fourth stage is to convert the inputted sinusoidal signal to a d.c. level indicative of the presence or absence of energy. The fourth stage includes a voltage comparator 52. The d.c. compare voltage is controlled by a voltage divider including resistors 24–27 and is applied to pin 2 of voltage comparator 52. When the voltage on pin 3 of the voltage comparator 52 goes above the compare voltage on pin 2, the output V4 of the fourth stage will go down. When the voltage V4 goes down, the voltage at pin 2 of the voltage comparator 52 goes down. This prevents the output of the voltage comparator 52 from toggling around if there is a voltage at pin 3 that's close to the voltage at pin 2. So it is only when the voltage applied to pin 3 drops below the new level at pin 2 that the output V4 will change again. In the preferred embodiment, the thresholds at pin 2 of voltage comparator 52 are:

Output Pin 7 (High to low) — 1.56 v.
(Low to high) — 1.33 v.

The +5 V supply in the fourth stage assures that the output pin 7 of comparator 52 is at the 5 V level even if the input signal is not.

Capacitor 49 is charged up by the sinusoidal signal V3 from the third stage. The signal path followed by V3 is from pin 14 of op amp 38, through diode 50, through resistor 13 and to capacitor 49. The charging time constant is controlled by resistor 13 and capacitor 49, and is 1 ms. The discharge path is from capacitor 49 back through resistors 13 and 14 since diode 50 blocks signal flow in the reverse direction. Hence, the discharge time constant is 11 ms, which is significantly higher than the charge time constant. This is necessary since if the charge and discharge time constants were the same, the voltage at pin 3 of the comparator 52 would go up for one half of the V3 signal cycle and go down the next half cycle. In such case, the threshold set at pin 2 of comparator 52 would never be reached.

Figure 2G:
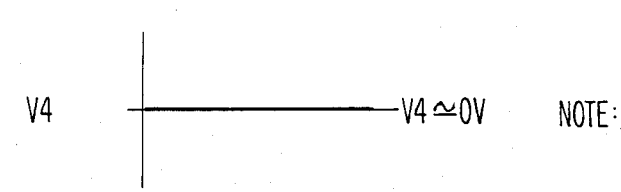

With the operation of the fourth stage understood, consider what happens when signal V3 is input to the fourth stage. When a signal is present on V3, the sinusoidal signal will charge up capacitor 49. When the voltage on capacitor 49 is charged above the d.c. threshold level set up on pin 2 of comparator 52, V4 will swing to zero (FIG. 2G) indicating the presence of energy. When the energy is gone, capacitor 49 discharges and the output V4 swings to a positive d.c. level. In essence then, the sinusoidal signal V3 is converted to a digital signal V4 which indicates the presence of energy on the receive line. As previously discussed, this digital output V4 may be input to a microprocessor which will evaluate the energy on-off times of V4 to determine if any of a ring back, dial tone, or busy signal is being received from remote equipment.

Having shown and described the preferred embodiment of the present invention, those skilled in the art will realize that various omissions, substitutions and changes in forms and details may be made without departing from the spirit of the invention. It is the intention, therefore, for the scope of the invention to be limited only as indicated by the following claims.

What is claimed is:

1. In a facsimile system controller, a circuit connected to a transmit-receive path of a transmission line to detect the presence of received energy on the transmission line, said circuit including a signal source coupled to a down line receiver; said circuit comprising:
    first means, coupled to said signal source and said transmission line, for nulling out any signals from said signal source which are a component of the transmit-receive path of said transmission line, thereby said first means having a receive signal output solely indicating said received energy; and
    energy detect means, receiving said receive signal, for producing a digital signal indicating the presence and absence of energy in said receive signal.

2. The circuit in accordance with claim 1 wherein said energy detect means includes:
    second means, receiving said receive signal, for filtering out noise which is outside of a specified bandwidth;
    third means, receiving said filtered receive signal, for amplifying said filtered receive signal, whereby an amplified signal is produced; and
    fourth means, receiving said amplified signal, for comparing said amplified signal with a reference voltage and providing a digital output which swings to a first state when said amplified signal is greater than said reference voltage.

3. The circuit in accordance with claim 2 wherein said first means further includes means for amplifying the receive signal by a noninverting gain.

4. The circuit in accordance with claim 2 wherein said second means further includes:
    means for biasing the receive signal by a d.c. offset, whereby the filtered receive signal is always above ground; and
    means for amplifying the filtered receive signal.

5. The circuit in accordance with claim 4 wherein said third means further includes:
    means for removing the d.c. offset from the filtered receive signal; and
    means for applying a second d.c. offset to the amplified signal.

6. The circuit in accordance with claim 5 wherein said fourth means includes:
    diode means, receiving said amplified signal, for allowing signal flow in the forward direction and blocking signal flow back to the third means;
    a voltage comparator;
    means for applying a compare voltage to the reference input of said comparator; and
    capacitor means, receiving the output of said diode means and providing the signal input to said voltage comparator, said capacitor means having a discharge time which is much greater than said capacitor means charge time.

7. The circuit in accordance with claim 2 wherein said transit-receive path is coupled to said transmission line via an isolation transformer.

8. The circuit in accordance with claim 2 wherein said transmission line is a telephone line and said signal source transmits DTMF tones.

9. The circuit in accordance with claim 2 wherein said first means includes:
    an operational amplifier;
    first coupling means for coupling said signal source to the noninverting input of said operational amplifier and to said transmission line;
    second coupling means for coupling said signal source to the inverting input of said operational amplifier; and
    feedback means for coupling the output of said operational amplifier back to the inverting input of said operational amplifier.

10. The circuit in accordance with claim 6 wherein said first means includes:
    an operational amplifier;
    first coupling means for coupling said signal source to the noninverting input of said operational amplifier and to said transmission line;
    second coupling means for coupling said signal source to the inverting input of said operational amplifier; and
    feedback means for coupling the output of said operational amplifier back to the inverting input of said operational amplifier.

11. The circuit in accordance with claim 10 wherein said first coupling means includes:
    an isolation transformer, a first side of said isolation transformer coupled to said transmission line; and
    a first resistor, a first side of said first resistor connected to said signal source, the second side of said first resistor connected to a first side of a second resistor and to one tap of the second side of said transformer, the second side of said second resistor connected to the noninverting input of said operational amplifier, and wherein a second tap of the second side of said transformer is connected to ground through a first capacitor.

12. The circuit in accordance with claim 11 wherein said second means includes:
    a third resistor, a first side of said third resistor connected to said signal source and the first side of said first resistor, the second side of said third resistor connected to the inverting input of said operational amplifier, and
    a fourth resistor, a first side of said fourth resistor connected to the second side of said third resistor and the inverting input of said operational amplifier, the second side of said fourth resistor connected to ground via a second capacitor; and
    wherein said feedback means includes a fifth resistor.

13. In a facsimile system controller, a circuit for nulling out transmit signals, comprising:
    a source of said transmit signals;
    an operational amplifier;
    first means for coupling said source of transmit signals to the noninverting input of said operational amplifier and to a two wire communications line, a remote transmitter coupled to said communications line, said remote transmitter transmitting receive signals to said facsimile system controller;

second means for coupling said source of transmit signals to the inverting input of said operational amplifier;

feedback means for coupling the output of said operational amplifier back to the inverting input of said operational amplifier; and wherein said transmit signals are nulled out at the output of said operational amplifier.

14. The circuit in accordance with claim 13 wherein said first means includes:

an isolation transformer, a first side of said isolation transformer coupled to said communications line; and a first resistor, a first side of said first resistor connected to said source of transmit signals, the second side of said first resistor connected to a first side of a second resistor and to one tap of the second side of said transformer, the second side of said second resistor connected to the noninverting input of said operational amplifier.

15. The circuit in accordance with claim 14 wherein a second tap of the second side of said transformer is connected to ground through a first capacitor.

16. The circuit in accordance with claim 15 wherein said second means includes:

a third resistor, a first side of said third resistor connected to said source of transmit signals and the first side of said first resistor, the second side of said third resistor connected to the inverting input of said operational amplifier; and a fourth resistor, a first side of said fourth resistor connected to the second side of said third resistor and the inverting input of said operational amplifier, the second side of said fourth resistor connected to ground via a second capacitor.

17. The circuit in accordance with claim 16 wherein said feedback means includes a fifth resistor.

18. The circuit in accordance with claim 17 further including a third capacitor in parallel with said fifth resistor.

* * * * *